US011159914B2

(12) United States Patent
Winter et al.

(10) Patent No.: US 11,159,914 B2
(45) Date of Patent: *Oct. 26, 2021

(54) DETECTION AND REMEDIATION OF ISLAND TRACKING AREA CODES IN A NETWORK

(71) Applicant: Verizon Patent and Licensing Inc., Washington, DC (US)

(72) Inventors: Christian Winter, Highland Village, TX (US); Xia Li, Burlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/833,720

(22) Filed: Mar. 30, 2020

(65) Prior Publication Data

US 2020/0228929 A1 Jul. 16, 2020

Related U.S. Application Data

(63) Continuation of application No. 16/202,887, filed on Nov. 28, 2018, now Pat. No. 10,645,533.

(51) Int. Cl.
*H04W 36/00* (2009.01)
*H04W 4/029* (2018.01)
*H04W 24/10* (2009.01)
*H04W 48/20* (2009.01)
*H04W 24/02* (2009.01)

(52) U.S. Cl.
CPC ........... *H04W 4/029* (2018.02); *H04W 24/02* (2013.01); *H04W 24/10* (2013.01); *H04W 48/20* (2013.01)

(58) Field of Classification Search
CPC ..... H04W 4/029; H04W 24/02; H04W 48/20; H04W 24/10
See application file for complete search history.

(56) References Cited

U.S. PATENT DOCUMENTS

| 2015/0312832 A1 | 10/2015 | Huang et al. | |
|---|---|---|---|
| 2016/0029253 A1* | 1/2016 | Sarkar | H04W 36/00835 455/436 |
| 2016/0142931 A1* | 5/2016 | Mondal | H04L 41/0886 370/252 |

OTHER PUBLICATIONS

Gou, et al., "A New Distance-weighted k-nearest Neighbor Classifier", Journal of Information & Computational Science 9:6 (2012) pp. 1429-1436.

\* cited by examiner

*Primary Examiner* — Lakeram Jangbahadur

(57) ABSTRACT

A method, a device, and a non-transitory storage medium are described in which an island tracking area code detection and remedial service is provided. A device may detect an island tracking area code cell based on a predicted optimal tracking area code. The device calculates scores for neighbor cells and their corresponding tracking area codes based on the distances of the neighbor cells from a target cell. The device may select the predicted optimal tracking area code based on these scores. The device may use the predicted optimal tracking area code as a basis to determine whether a tracking area code assigned to the target cell is an island tracking area code cell. The device may perform a remedial measure when an island tracking area code cell is detected.

20 Claims, 16 Drawing Sheets

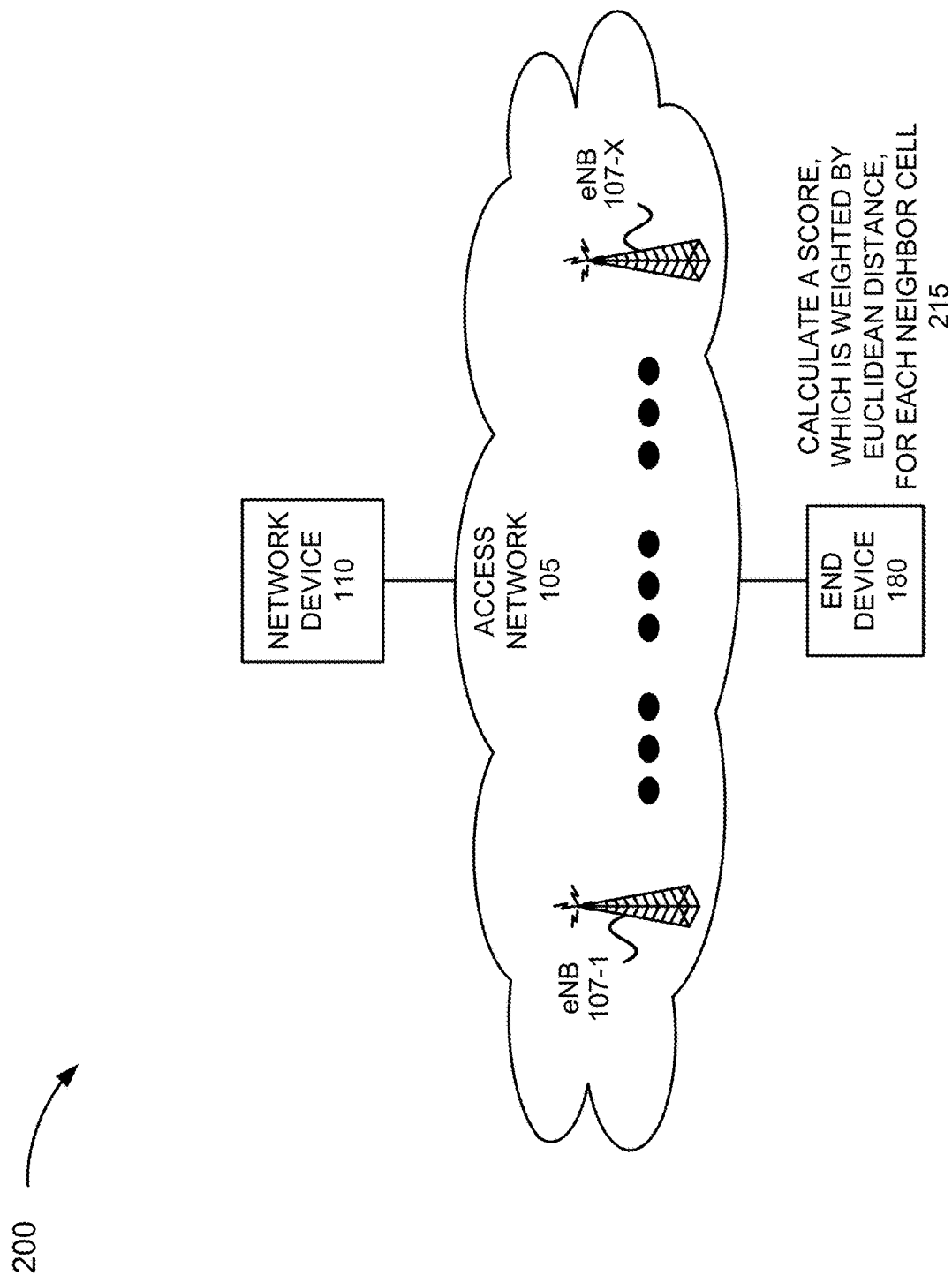

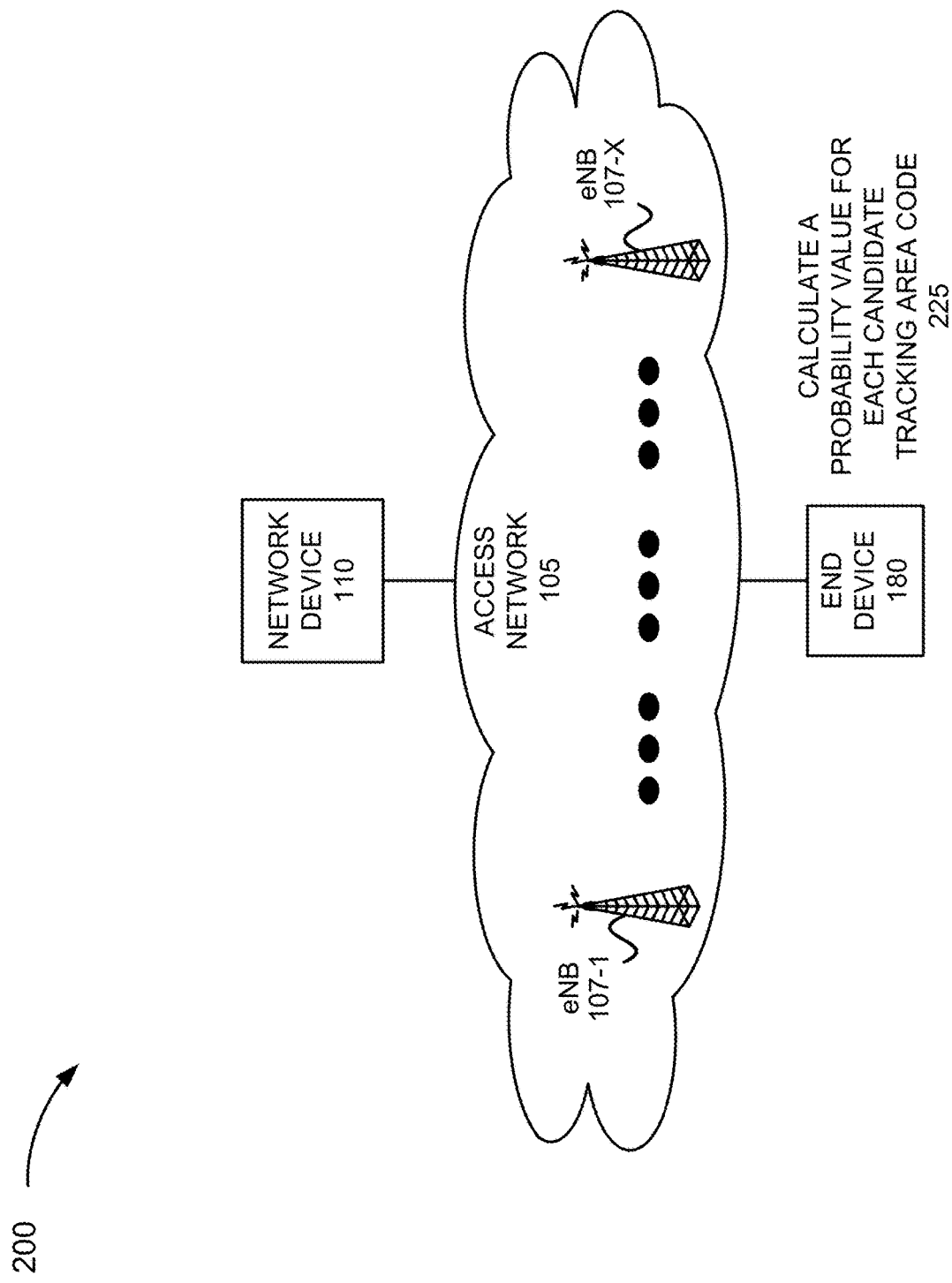

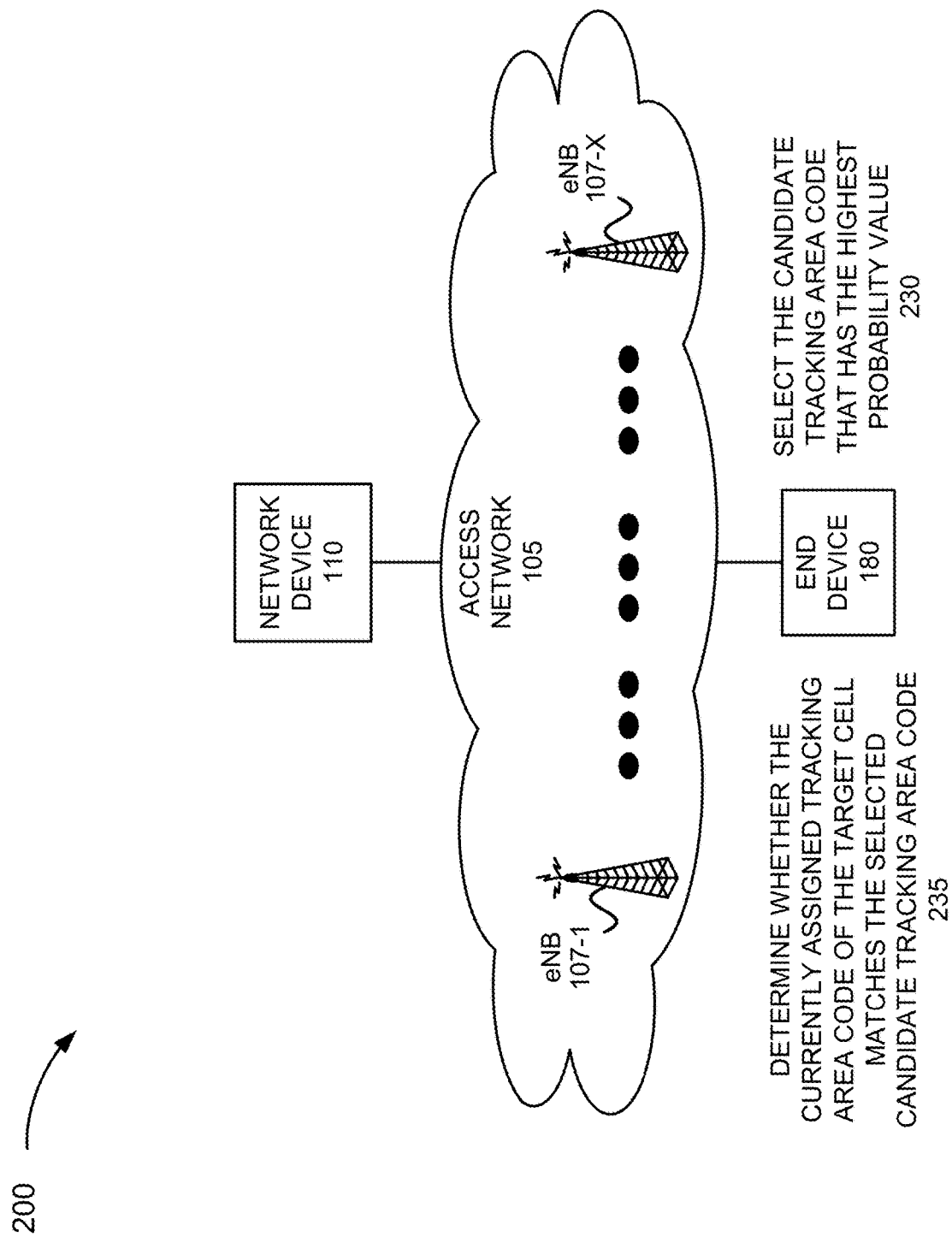

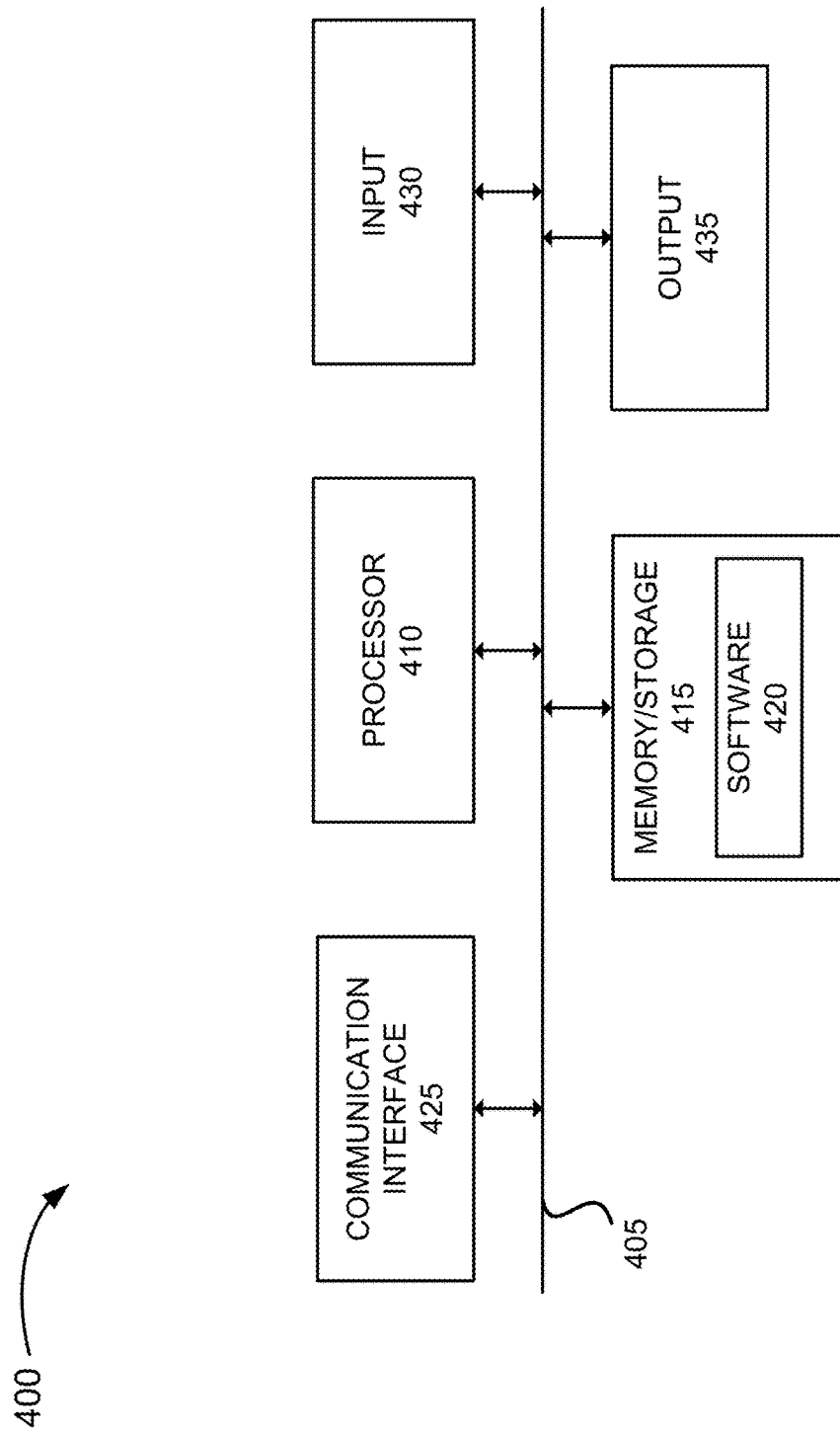

DETECTION AND REMEDIATION OF ISLAND TRACKING AREA CODES IN A NETWORK

CROSS REFERENCE TO RELATED APPLICATION

This patent application is a continuation of U.S. patent application Ser. No. 16/202,887, entitled "DETECTION AND REMEDIATION OF ISLAND TRACKING AREA CODES IN A NETWORK" and filed on Nov. 28, 2018, the disclosure of which is incorporated herein by reference in its entirety.

BACKGROUND

In a cellular network, tracking area codes (TACs) may be assigned to each cell. Cells sharing tracking area codes in a geographic cluster form tracking areas (TAs). Tracking areas are used in the cellular network to keep track of the location of mobile devices. Typically, the mobile device will register in a tracking area and periodically update its registration as defined by network parameters. This registration process is commonly known as a tracking area update (TAU).

BRIEF DESCRIPTION OF THE DRAWINGS

FIGS. 2A-2J are diagrams illustrating exemplary processes of exemplary embodiments of the island tracking area code detection and remedial service;

FIG. 4 is a diagram illustrating exemplary components of a device that may correspond to one or more of the devices illustrated and described herein.

DETAILED DESCRIPTION OF PREFERRED EMBODIMENTS

Figure 1A:
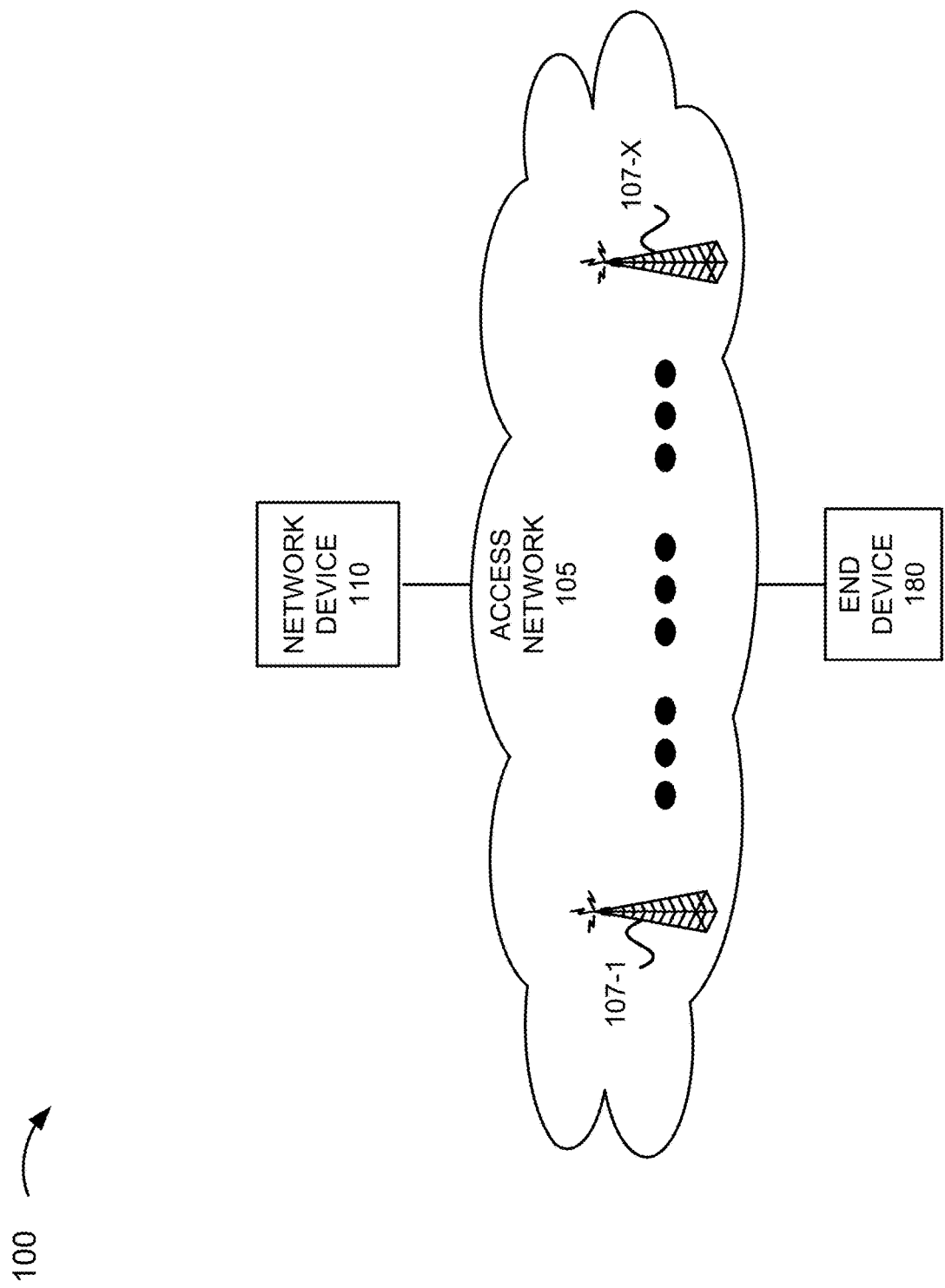
FIGS. 1A and 1B are diagrams illustrating an exemplary environment in which an exemplary embodiment of an island tracking area code detection and remedial service may be implemented.

The following detailed description refers to the accompanying drawings. The same reference numbers in different drawings may identify the same or similar elements. Also, the following detailed description does not limit the invention.

Typically, when a mobile device moves from one tracking area to another, the mobile device performs a tracking area update procedure so as to update its registration with the network. In turn, the network can inform the mobile device of an incoming data transmission via paging. A network operator, a network administrator, or other entity may assign each cell with a tracking area code. According to some implementations, the network operator, the network administrator, or other entity may assign the same tracking area code to all cells of the same access device (e.g., an evolved Node B (eNB), etc.).

Unfortunately, the assignment of tracking area codes to cells in the network can yield a cell with an island tracking area code. An island tracking area code cell is defined as a cell that does not share a tracking area code with any or most of its surrounding closest neighboring cells. As a consequence, the mobile device will perform tracking area updates for any or most handoffs from this type of cell to any other target cell. This can result in unnecessary use of both resources by the mobile device as well as network resources by the network in support of the tracking area update procedure. Additionally, these types of cells can cause the network to send unnecessary paging messages, and potentially degrade the paging success rate. Furthermore, currently, the identification of cells assigned with an island tracking area code is performed via a manual process that is extremely tedious and requires a person to visually check an inordinate number of cells (e.g., 500,000 cells or more), which can lead to inaccurate results. Additionally, subsequent to the initial tracking area planning and deployment in the network, tracking area management of the network can be an on-going process due to changes in various network parameters (e.g., paging capacities of eNBs, mobility management entity (MME) paging capacities and servicing of tracking area updates, number of subscribers and paging requests, etc.) that may impact the tracking area framework (e.g., number of eNBs per tracking area, etc.).

According to exemplary embodiments, an island tracking area code detection and remedial service is provided. According to an exemplary embodiment, a network device or an end device includes logic that provides the island tracking area code detection and remedial service. According to exemplary embodiments, the island tracking area code detection and remedial service detects island tracking area codes, and provides remedial measures when island tracking area codes are detected. As previously mentioned, an island tracking area code is a cell that does not share a tracking area code with any or most of the tracking area codes assigned to its closet (contiguous) neighboring cells. For example, an island tracking area code may effectively require a mobile device to perform a tracking area update for any or most handoffs from and/or to the island tracking area code cell relative to any other handoff cell (e.g., a nearest neighbor cell).

According to an exemplary embodiment, the island tracking area code detection and remedial service obtains tracking area code assignment data for cells of a network. According to an exemplary implementation, the network may be an Evolved Universal Mobile Telecommunications System (UMTS) Terrestrial Radio Access Network (E-UTRAN) of a Long Term Evolution (LTE) network, an LTE-Advanced (LTE-A) network, and/or an LTE-A Pro network. According to other exemplary implementations, the network may be a different type of radio access network, such as a future or next generation RAN (e.g., a 5G-access network (5G-AN)), a Third Generation (3G) RAN, a 3.5G RAN, a U-TRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, and/or an Evolution Data Optimized (EV-DO) RAN.

According to an exemplary embodiment, the tracking area code assignment data includes the tracking area code for each cell and location data for each cell. For example, the location data may include latitude and longitude coordinates or another form of geographic location data. The tracking area code assignment data may include other types of data, as described herein.

According to an exemplary embodiment, the island tracking area code detection and remedial service identifies a target cell and a configurable number of nearest neighboring cells. According to an exemplary embodiment, the island tracking area code detection and remedial service calculates a predicted optimal tracking area code for the target cell based on the tracking area codes assigned to the nearest neighboring cells of the target cell. According to an exemplary embodiment, the island tracking area code detection and remedial service calculates a Euclidean distance for each neighboring cell relative to the target cell. According to an exemplary embodiment, the island tracking area code detection and remedial service calculates a score, which may be weighted based on the Euclidean distance from the target cell, for each neighboring cell, as described herein.

According to an exemplary embodiment, the island tracking area code detection and remedial service calculates a score for each predicted optimal tracking area code based on an aggregation of scores associated with tracking area codes of neighboring cells that match the tracking area code of the predicted optimal tracking area code, as described herein. According to an exemplary embodiment, the island tracking area code detection and remedial service calculates a probability for each predicted optimal tracking area code based on its score. According to an exemplary embodiment, the island tracking area code detection and remedial service may select the predicted optimal tracking area code whose probability is the highest among all predicted optimal tracking codes as a criterion for determining whether the assigned tracking area code of the target cell is an island tracking area code or not.

According to an exemplary embodiment, the island tracking area code detection and remedial service compares the currently assigned tracking area code of the target cell to the selected predicted optimal tracking area code. According to an exemplary embodiment, when the currently assigned tracking area code matches the predicted optimal tracking area code, it is determined that an island tracking area code issue does not exist (or is minimally present). When the currently assigned tracking area code of the target cell does not match the predicted optimal tracking area code, the probability value of the predicted optimal tracking code may be compared to one or multiple threshold values. According to various exemplary embodiments, depending on the outcome of the comparison, the island tracking area code detection and remedial service may perform various remedial measures when it is determined that an island tracking area code issue exists, or may not perform a remedial measure when it is determined that an island tracking area code issue does not exist (or is minimally present). For example, when it is determined that an island tracking area code issue exists, the remedial service may cause or execute a new assignment of a tracking area code to the target cell.

As a result of the foregoing, the island tracking area code detection and remedial service may reduce unnecessary overhead wasted on inefficient paging and tracking area updates. For example, the island tracking area code detection and remedial service may reduce the need of a mobile device to perform unnecessary tracking area updates, and more optimally use resources (e.g., processor, memory, communication link, etc.) from the mobile device and network-side perspectives. Additionally, the island tracking area code detection and remedial service may minimize unnecessary paging messages, and potentially improve the paging success rate. Further, in turn, the island tracking area code detection and remedial service may improve the customer experience, increase the probability that users are properly paged, avoid missed calls or other types of incoming transmissions, and improve other types of performance metrics (e.g., throughput, latency, etc.).

FIG. 1A is a diagram illustrating an exemplary environment 100 in which an exemplary embodiment of the island tracking area code detection and remedial service may be implemented. As illustrated, environment 100 includes an access network 105. Access network 105 includes access devices 107-1 through 107-X (also referred to as access devices 107, and individually and generally as access device 107). According to an exemplary embodiment, environment 100 includes an end device 180 and/or a network device 110.

The number, the type, and the arrangement of network devices in environment 100, as illustrated and described, are exemplary. The number of end device 180 is also exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture). The number, the type, and the arrangement of networks in environment 100, as illustrated and described, are exemplary.

Access network 105 may include one or multiple networks of one or multiple types and technologies. For example, access network 105 may include a Fourth Generation (4G) RAN, a 4.5G RAN, a 5G RAN, a future generation RAN, or a legacy RAN, as described herein. Depending on the implementation, access network 105 may include one or multiple types of access devices 107. For example, access devices 107 may be implemented to include an eNB, a next generation Node B (gNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node.

Figure 1B:
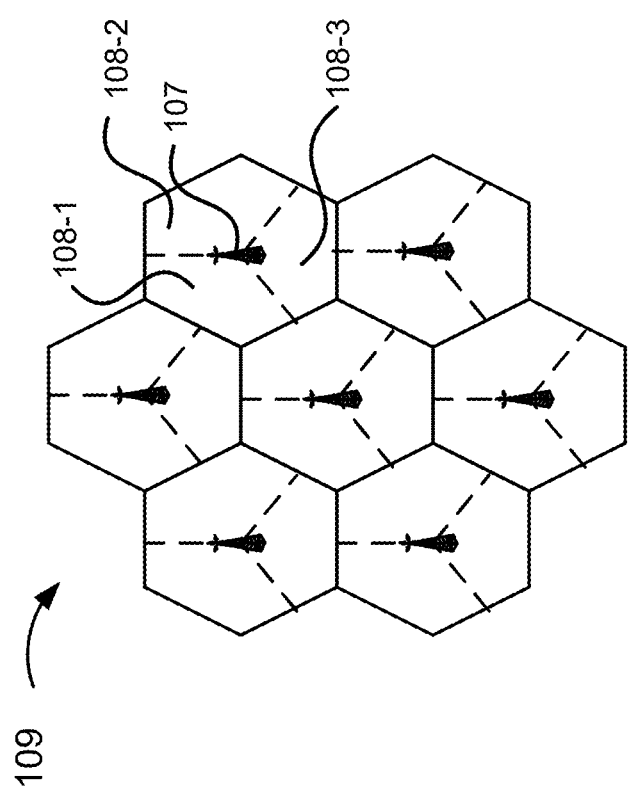

As previously described, a tracking area code may be assigned to each cell (e.g., an E-UTRAN cell, etc.), and in some exemplary implementations, the same tracking area code may be assigned to all E-UTRAN cells of the same access device 107. A tracking area may include multiple E-UTRAN cells or access devices 107 (e.g., within a geographic area) that share the same tracking area code. For example, referring to FIG. 1B, a tracking area 109 may include access devices 107 within a geographic area. Each access device 107 includes three cells 108-1 through 108-3 (also referred to as cells 108, and individually or generally as cell 108). Cells 108 may share the same tracking area code. The number of access devices 107, the number of cells 108 associated with each access device 107, the shape of each cell 108, and so forth, with reference to tracking area 109 are merely exemplary and included herein for the sake of description (i.e., other configurations may be implemented).

Referring back to FIG. 1A, according to various exemplary embodiments, end device 180 and/or network device 110 may provide the island tracking area code detection and remedial service. For example, network device 110 may include logic that provides the island tracking area code detection and remedial service. According to another example, end device 180 may include logic that provides the island tracking area code detection and remedial service. According to yet another example, network device 110 and end device 180 may cooperatively operate, and each includes logic that provides the island tracking area code detection and remedial service, as described herein.

Network device 110 may be a computational and communication network device that includes logic that provides the island tracking area code detection and remedial service. For example, network device 110 may implemented as a stand-alone device or a network device of an Operation, Administration, and Management (OAM) system. According to some exemplary embodiments, network device 110 may provide the island tracking area code detection and remedial service in its entirety. According to such an embodiment, end device 180 may be omitted from environment 100. According to other exemplary embodiments, network device 110 may provide only a portion of the island tracking area code detection and remedial service. For example, network device 110 and end device 180 may cooperatively provide the island tracking area code detection and remedial service. By way of further example, one or multiple steps or functions pertaining to the island tracking area code detection and remedial service, as described herein, may be performed by network device 110, while other step(s) or function(s) may be performed by end device 180.

End device 180 may be a computational and communication device that includes logic that provides the island tracking area code detection and remedial service. For example, end device 180 may be implemented as a computer, a terminal, an end user device of an OAM system, or a mobile end device. According to some exemplary embodiments, end device 180 may provide the island tracking area code detection and remedial service in its entirety. According to such an embodiment, network device 110 may be omitted from environment 100. According to other exemplary embodiments, end device 180 may provide only a portion of the island tracking area code detection and remedial service. For example, one or multiple steps or functions pertaining to the island tracking area code detection and remedial service, as described herein, may be performed by end device 180, while other step(s) or function(s) may be performed by network device 110.

FIGS. 2A-2J are diagrams illustrating an exemplary process of an exemplary embodiment of the island tracking area code detection and remedial service. As illustrated, an environment 200, which is consistent with environment 100, includes access devices implemented as eNBs 107.

Figure 2A:
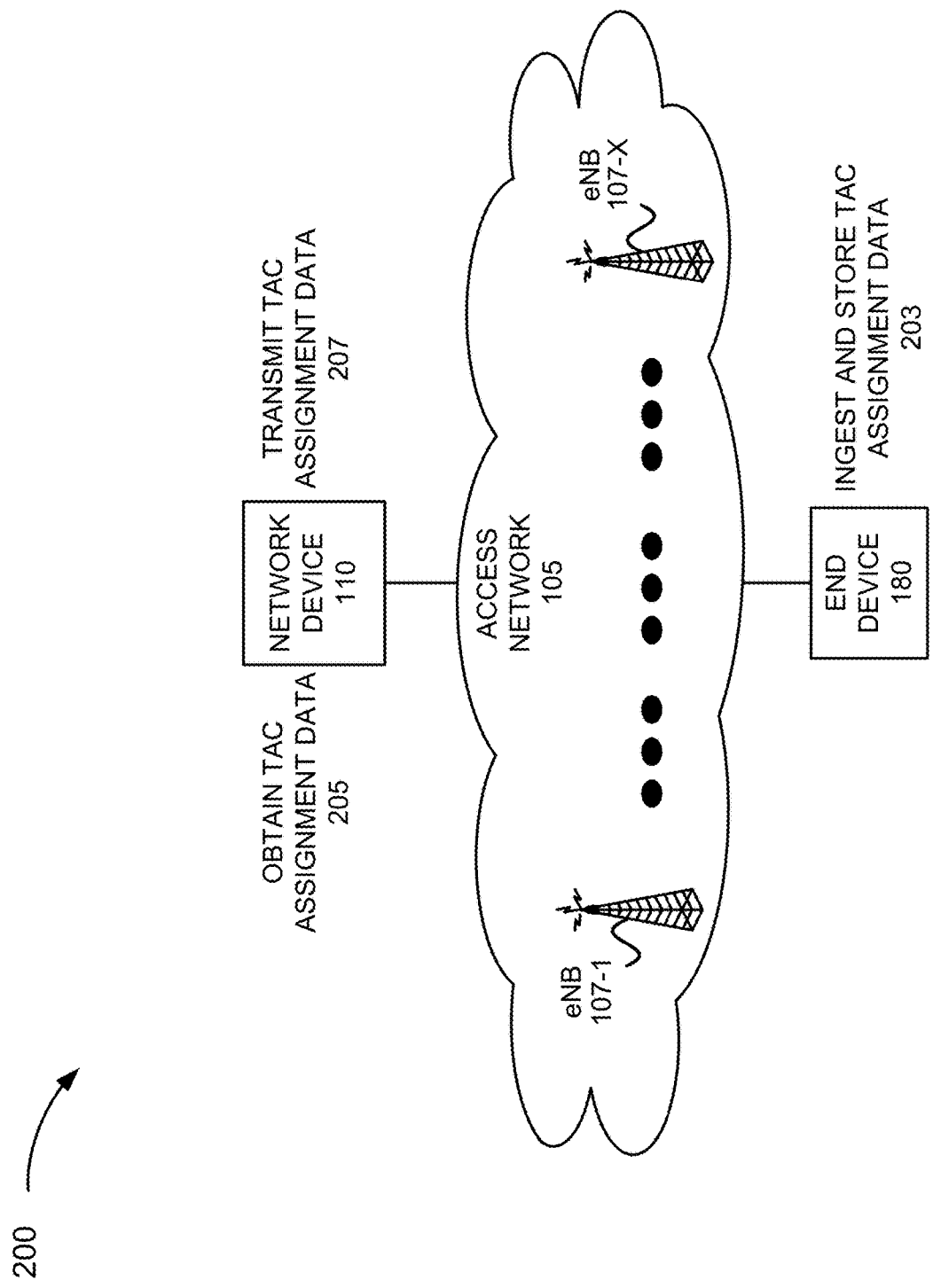

Referring to FIG. 2A, end device 180 may ingest and store tracking area code assignment data 203. According to some exemplary implementations, end device 180 may obtain the tracking area code assignment data from network device 110. For example, although not illustrated, end device 180 may transmit a request for the tracking area code assignment data to network device 110. In response to receiving the request, network device 110 obtains the tracking area code assignment data 205, and transmits the tracking area code assignment data 207 to end device 180. According to other exemplary implementations, end device 180 may pre-store this data, a user of end device 180 (not illustrated) may load the data, or another process may be performed so that end device 180 stores the tracking area code assignment data of access network 105. An exemplary embodiment of the tracking area code assignment data is described further below. The tracking area code assignment data includes data that indicates the tracking area code for each cell of access network 105.

Figure 3:
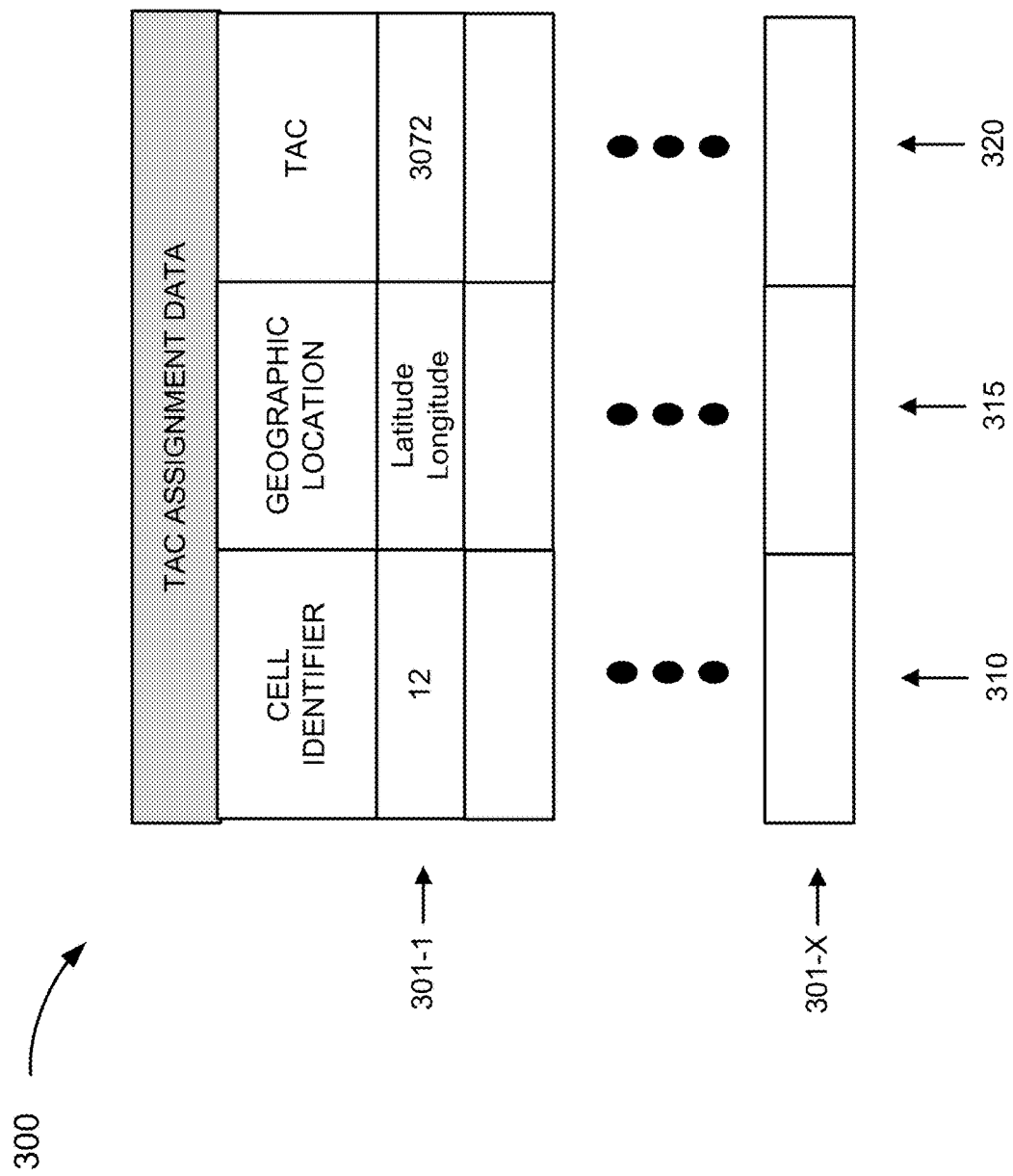
FIG. 3 is a diagram illustrating exemplary tracking area code assignment of the island tracking area code detection and remedial service.

FIG. 3 is a diagram illustrating exemplary tracking area code assignment data that may be stored in a table 300. As illustrated, table 300 may include a cell identifier field 310, a geographic location field 315, and a tracking area code field 320. As further illustrated, table 300 includes entries 301-1 through 301-X (also referred as entries 301, or individually or generally as entry 301) that each includes a grouping of fields 310, 315, and 320 that are correlated (e.g., a record, etc.). Tracking area code assignment data is illustrated in tabular form merely for the sake of description. In this regard, tracking area code assignment data may be implemented in a data structure different from a table. The values illustrated in field 301-1 are exemplary.

Cell identifier field 310 may store data indicating an identifier of a cell. The identifier may be locally or globally unique or not. Geographic location field 315 may store data indicating a geographic location. For example, geographic location field 315 may store latitude and longitude coordinates of the cell (e.g., a point in the cell area; a point associated with an antenna of access device 107). Tracking area code field 320 may store data indicating a tracking area code that is assigned to a cell.

According to other exemplary implementations, table 300 may store additional, fewer, and/or different instances of tracking area code assignment data in support of the island tracking area code detection and remedial service, as described herein. For example, table 300 may include an E-UTRAN cell global identifier (ECGI) field that stores data indicating a unique identification of a cell at a global level. Additionally, or alternatively, table 300 may include a tracking area field that stores data indicating a tracking area, and/or other fields that may store various types of data, such as an antenna identifier of access device 107, an identifier of access device 107, a physical cell identifier of a cell, and so forth.

Figure 2B:
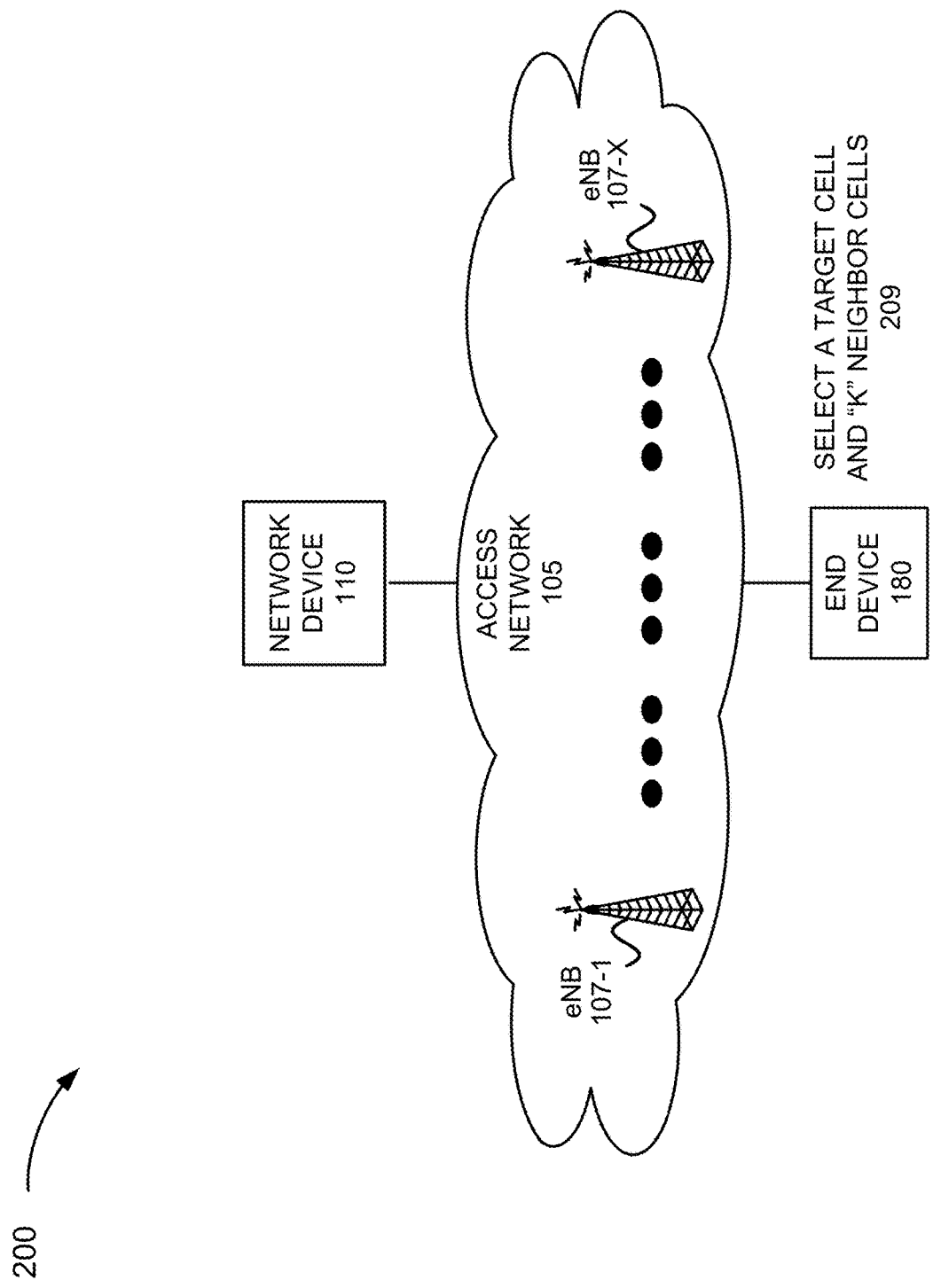

Referring to FIG. 2B, end device 180 includes logic to select a target cell and k neighbor cells based on the tracking area code assignment data. For example, the target cell may be any cell of access network 105. By way of further example, the target cell may be considered a cell-under-test for island tracking area code detection. In this regard, the island tracking area code detection and remedial service may test each cell or a portion of cells of access network 105. According to some exemplary implementations, k may be equal to k−1. For example, according to an exemplary scenario, when all of the k neighbor cells are at the same location (e.g., according to their geographic coordinates), and the number of neighbor cells located at the same location exceeds k, end device 180 may perform a random selection from all the neighbor cells located at the same location in order to select only k neighbors. The random selection may include the selection of the target cell. As a result, the target cell may be excluded from the k neighbor cells by way of k=k−1.

Figure 2C:
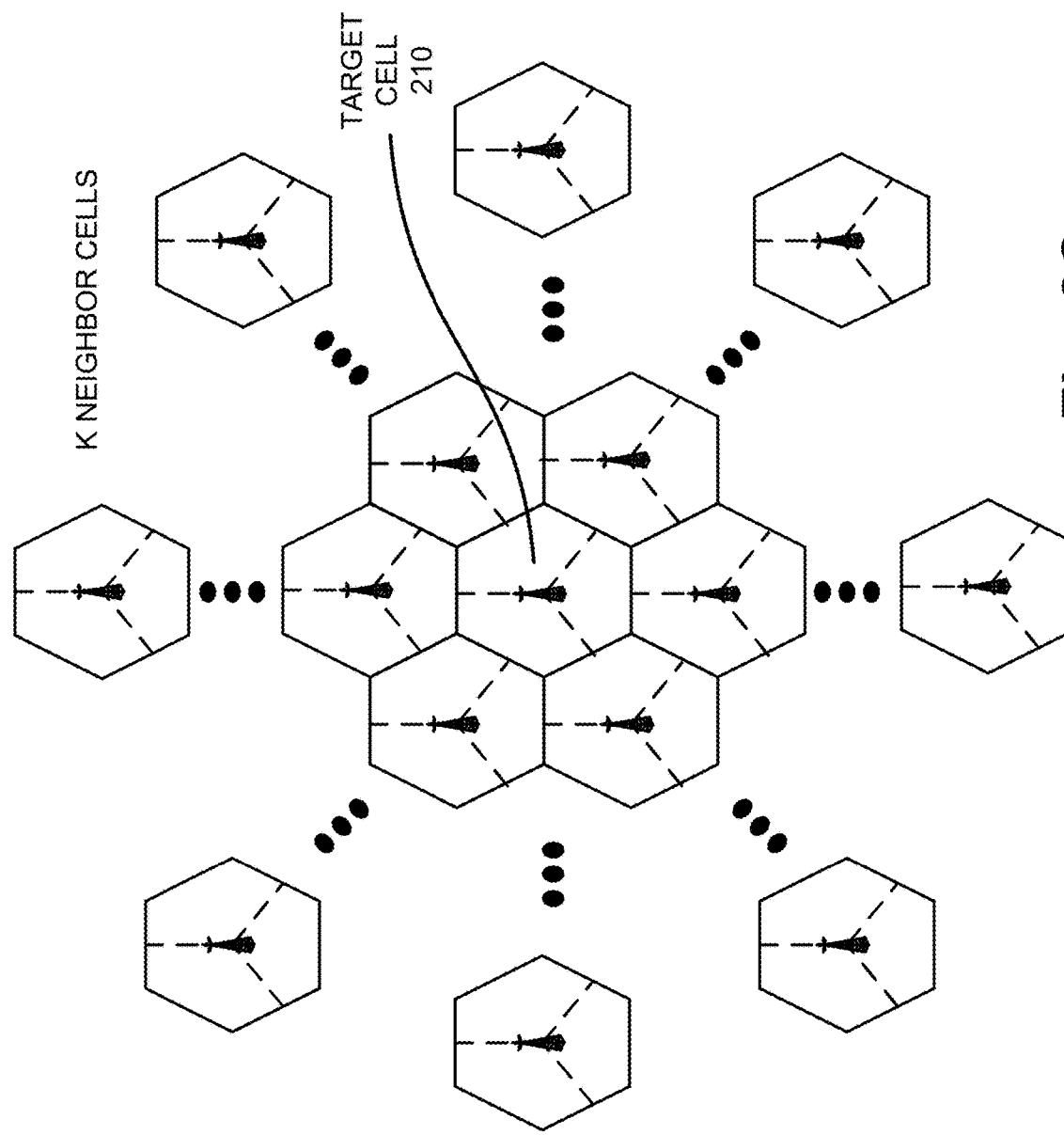

According to an exemplary embodiment, end device 180 may use a K-Nearest Neighbor (KNN) algorithm to identify k neighbor cells. According to an exemplary implementation, a k-d tree or a k-dimensional tree data structure may be used by the KNN algorithm to identify k neighbor cells. According to an exemplary embodiment, number k is a configurable parameter. For example, when k=30, the nearest 30 neighbor cells for each target cell will be identified. FIG. 2C is a diagram illustrating this concept in which a target cell 210 is selected and k closest neighbor cells of target cell 210 may be identified. According to other exemplary embodiments, end device 180 may use a different algorithm (e.g., a derivative/variant of KNN, condensed nearest neighbor rule (CNNR), fast condensed nearest neighbor rule (FCNN), locally adaptive KNN, KNN with K-Means, etc.) and/or a different data structure (e.g., a ball tree, a principal axis tree, etc.), to identify and select target cells and k neighbor cells included in the tracking area code assignment data.

Figure 2D:
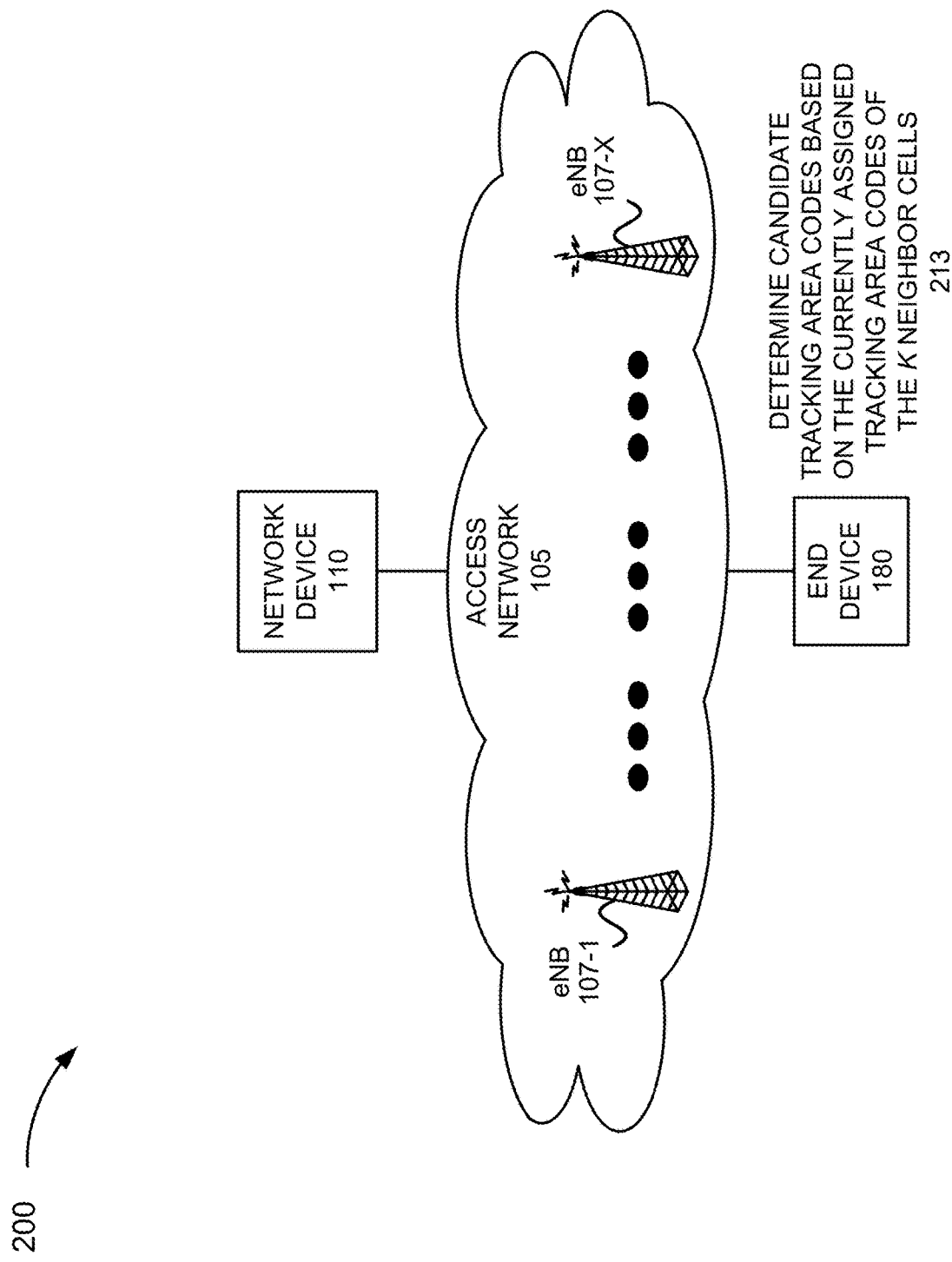

Referring to FIG. 2D, end device 180 includes logic that determines a candidate tracking area code based on the currently assigned tracking area codes of the k neighbor cells 213. For example, end device 180 may select from any tracking area code that is currently assigned to a k neighbor cell of the target cell. According to an exemplary implementation, the selection of a candidate tracking area code includes selecting a tracking area code that most of its neighbors cells share as well. By way of further example, and in accordance with the example described above, assume that k=30, and 20 of the neighbor cells share the same tracking area code (e.g., 12345) and 10 other neighbor cells share the same tracking area code that is different from the 20 neighbor cells (e.g., 12344). According to this example, end device 180 may select tracking area codes 12345 and 12344 as candidate tracking area codes.

Referring to FIG. 2E, end device 180 includes logic that calculates a score, which is weighted by distance, for each neighbor cell 215. According to an exemplary implementation, end device 180 calculates a Euclidean distance of each k-neighbor cell relative to the target cell using the geographic location data (e.g., geographic location field 315 of table 300). For example, the Euclidean distance may be calculated based on the following expression:

$$\text{Euclidean Distance}(A,B) = \sqrt{(A_x - B_x)^2 + (A_y - B_y)^2} \quad (1),$$

in which x represents longitude and y represents latitude. As a result, end device 180 may store distance data, such as distance data illustrated in Table 1 below.

TABLE 1

| Neighbor Cell | $NC_0$ | $NC_1$ | ••• | $NC_{k-1}$ |
|---|---|---|---|---|
| Distance | $D_0$ | $D_1$ | ••• | $D_{k-1}$ |
| TAC of NC | $TAC_0$ | $TAC_1$ | ••• | $TAC_{k-1}$ |

$TAC_i$ may be equal to $TAC_j$ for $i \neq j$.

End device 180 includes logic that calculates the score based on the calculated distance to the target cell. According to an exemplary implementation, end device 180 calculates the score based on the following exemplary expression:

$$S_i = \frac{d(x', x_k^{NN}) - d(x', x_i^{NN})}{d(x', x_k^{NN}) - d(x', x_1^{NN})} \quad (2)$$

if $d(x', x_k^{NN}) \neq d(x', x_1^{NN})$, $S_i = 1$ if $d(x', x_k^{NN}) = d(x', x_1^{NN})$, in which $S_i$ is the score for neighbor cell ($NC_i$). The variable $d(x', x_k^{NN})$ is the maximum "distance to target" and the variable $d(x', x_1^{NN})$ is the minimal "distance to target." In other words, $d(x', x_k^{NN})$ is the largest distance from the target cell to a neighbor cell (e.g., $d_{max}$), while $d(x', x_1^{NN})$ is the shortest distance from the target cell to a neighbor cell (e.g., $d_{min}$). The variable $d(x', x_i^{NN})$ is the distance from the target cell to each of its neighbor cells ($NC_i$).

End device 180 may calculate the score using equation 2 and the data of Table 1 in which a maximum distance and a minimum distance among all distances $(d_0 \sim d_{k-1}) = d_{max}$ and $d_{min}$ is used, as well as the respective distances ($d_i$) for each neighbor cell from the target cell. In this regard, for each neighbor cell ($NC_i$), a score $S_i = (d_{max} - d_i)/(d_{max} - d_{min})$ may be calculated. Since $d_{max}$ is not likely to be equal to $d_{min}$ when k is above a minimum value (e.g., k>4 or some other value), this equation is valid. $S_i$ may range between the values of 0 to 1. The closer the neighbor cell is to the target cell, the higher the value of $S_i$. As a result, end device 180 may store score data, such as score data illustrated in Table 2 below.

TABLE 2

| Neighbor Cell | $NC_0$ | $NC_1$ | ••• | $NC_{k-1}$ |
|---|---|---|---|---|
| Distance | $D_0$ | $D_1$ | ••• | $D_{k-1}$ |
| TAC of NC | $TAC_0$ | $TAC_1$ | ••• | $TAC_{k-1}$ |
| Score of NC | $S_0$ | $S_1$ | ••• | $S_{k-1}$ |

Figure 2F:
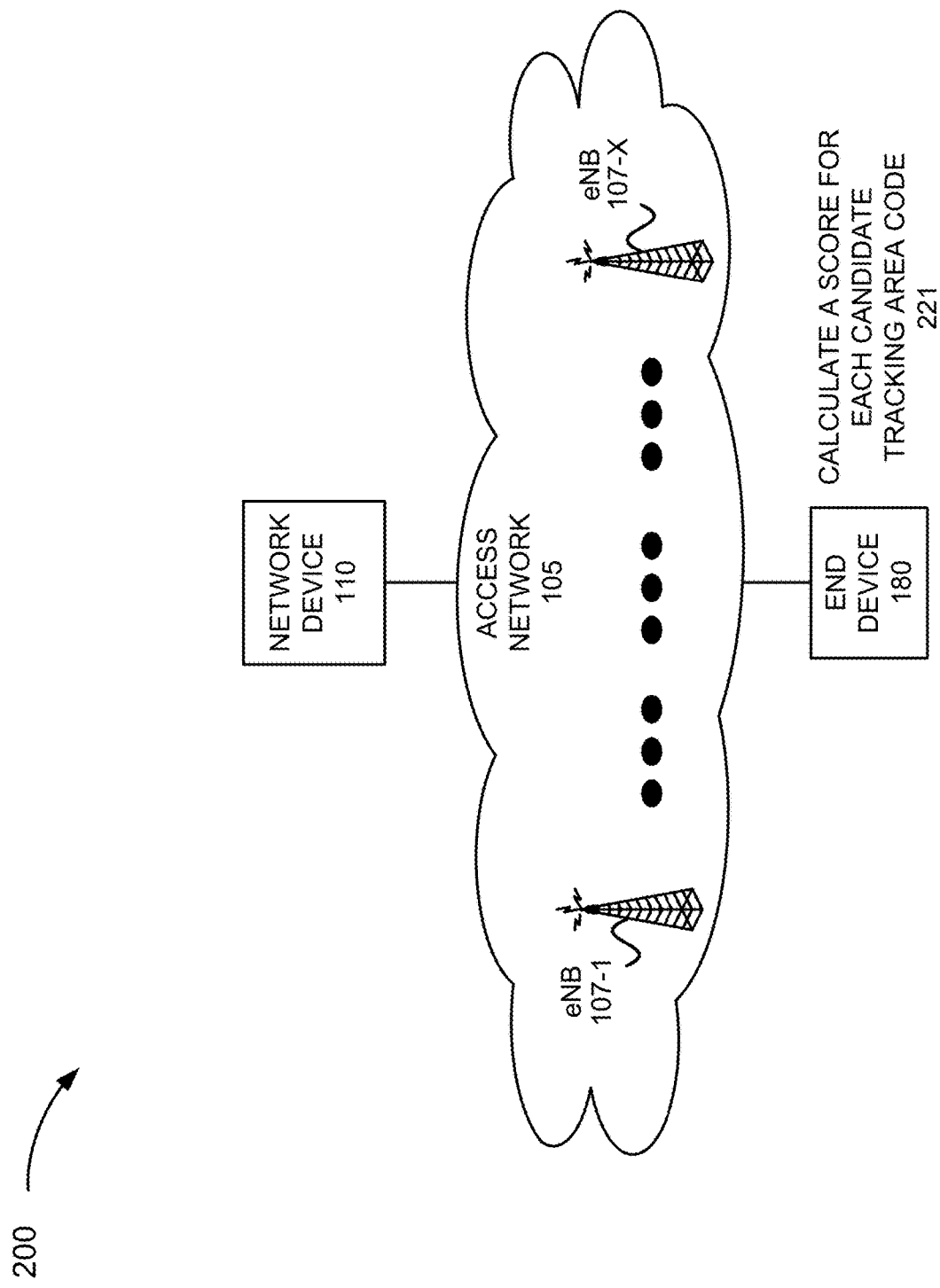

Referring to FIG. 2F, end device 180 includes logic that calculates a score for each candidate tracking area code 221. According to an exemplary implementation, end device 180 aggregates the scores of currently assigned tracking area codes shared by neighbor cells that match the candidate tracking area code. For example, referring to Table 2, if $TAC_0$ of $NC_0 = TAC_1$ of $NC_1 = C\_TAC_0$, then a score for a candidate $TAC_0$ ($C\_TAC_0$) may be calculated as $S(C\_TAC_0) = S_0 + S_1$. As a result, end device 180 may store score data for candidate TACs, such as candidate TAC score data illustrated in Table 3 below.

TABLE 3

| Candidate TAC | $C\_TAC_0$ | $C\_TAC_1$ | ••• | $C\_TAC_{n-1}$ |
|---|---|---|---|---|
| Score of Candidate TAC | $C\_S_0$ | $C\_S_1$ | ••• | $C\_S_{n-1}$ |

Referring to FIG. 2G, end device 180 includes logic that calculates a probability for each candidate tracking area code 225. For example, the probability may be the probability of the candidate tracking area code being the correct tracking area code for the target cell. According to an exemplary implementation, end device 180 may calculate probability values based on the normalization of the scores of candidate tracking area codes so that their sum is equal to 1. As a result, end device 180 may store probability value data for candidate TACs, such as the probability value data illustrated in Table 4 below.

TABLE 4

| Candidate TAC | $C\_TAC_0$ | $C\_TAC_1$ | ••• | $C\_TAC_{n-1}$ |
|---|---|---|---|---|
| Score of Candidate TAC | $C\_S_0$ | $C\_S_1$ | ••• | $C\_S_{n-1}$ |
| Probability of Candidate TAC | $P_0$ | $P_1$ | ••• | $P_{n-1}$ |

Referring to FIG. 2H, end device 180 includes logic that selects the candidate tracking area code that has the highest probability value 230. That is, the candidate tracking area code whose probability is the highest among all candidate tracking area codes, may be selected.

According to an exemplary embodiment, end device 180 includes logic to determine whether the currently assigned tracking area code of the target cell is an island tracking area code based on the selected candidate tracking area code. According to an exemplary implementation, end device 180 includes logic that determines whether or not the currently assigned tracking area code matches the selected candidate tracking area code 235. Additionally, according to an exemplary implementation, end device 180 includes logic that compares the probability of the candidate tracking area code to a threshold probability value. For example, when end device 180 determines that the currently assigned tracking area code does not match the selected candidate tracking area code, and the candidate tracking area code has a probability value that satisfies a threshold probability value, end device 180 may determine that the target cell is assigned an island tracking area code. Conversely, when the currently assigned tracking area code matches the selected candidate tracking area code, end device 180 may determine that the target cell is not assigned an island tracking area code. Additionally, for example, when the currently assigned tracking area code does not match the selected candidate tracking area code, and the candidate tracking area code has a probability value that does not satisfy the threshold probability value, end device 180 may determine that the target cell is not assigned an island tracking area code.

According to various exemplary embodiments, the threshold probability value is a configurable parameter value from 0 to 1. Depending on the value assigned, the number of island tracking area codes (or predicted island tracking area codes) may vary. For example, the higher the threshold probability value, end device 180 may detect a fewer number of island tracking area codes. Conversely, the lower the threshold probability value, end device 180 may detect a larger number of island tracking area codes.

Figure 2I:
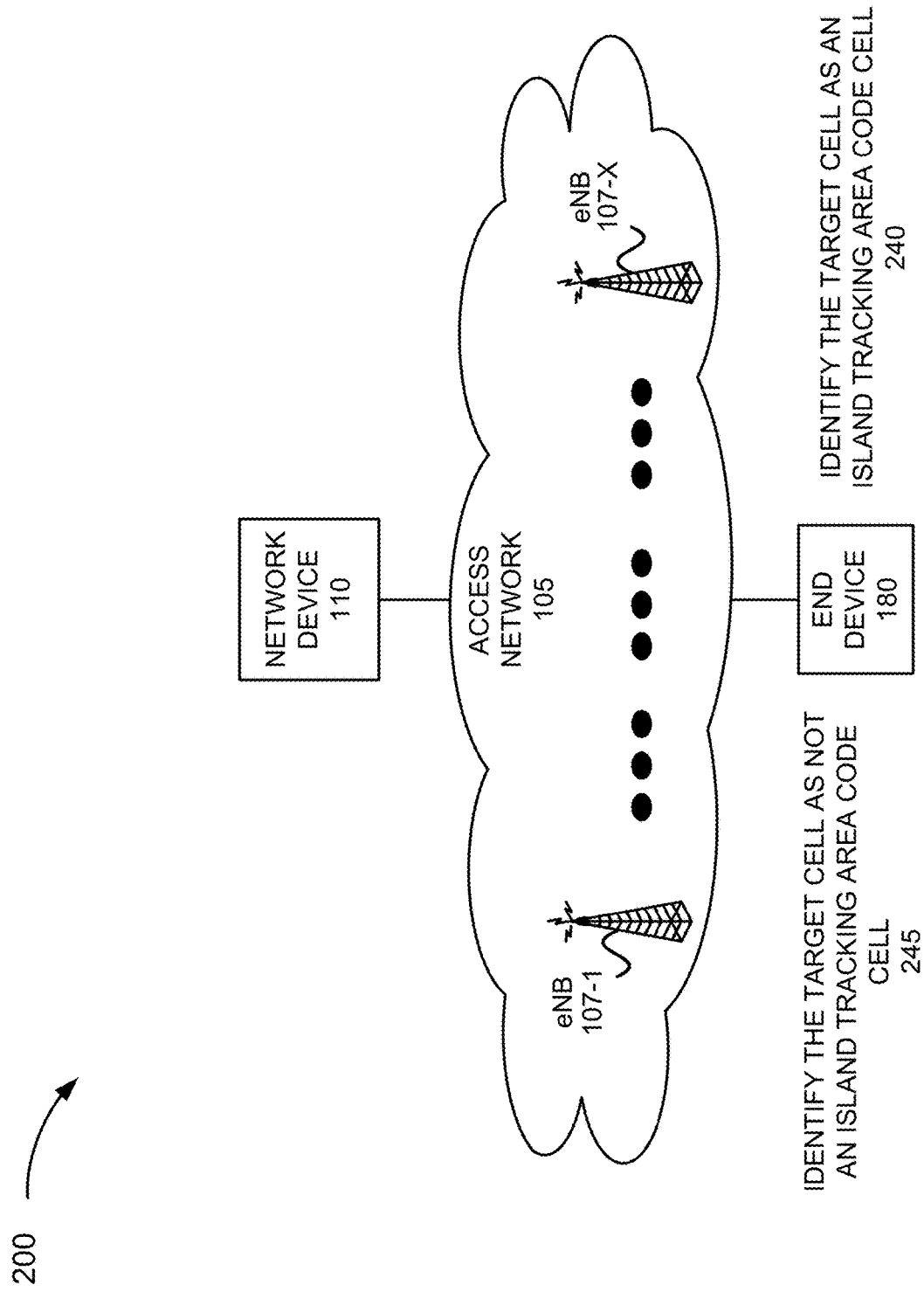
Figure 2J:
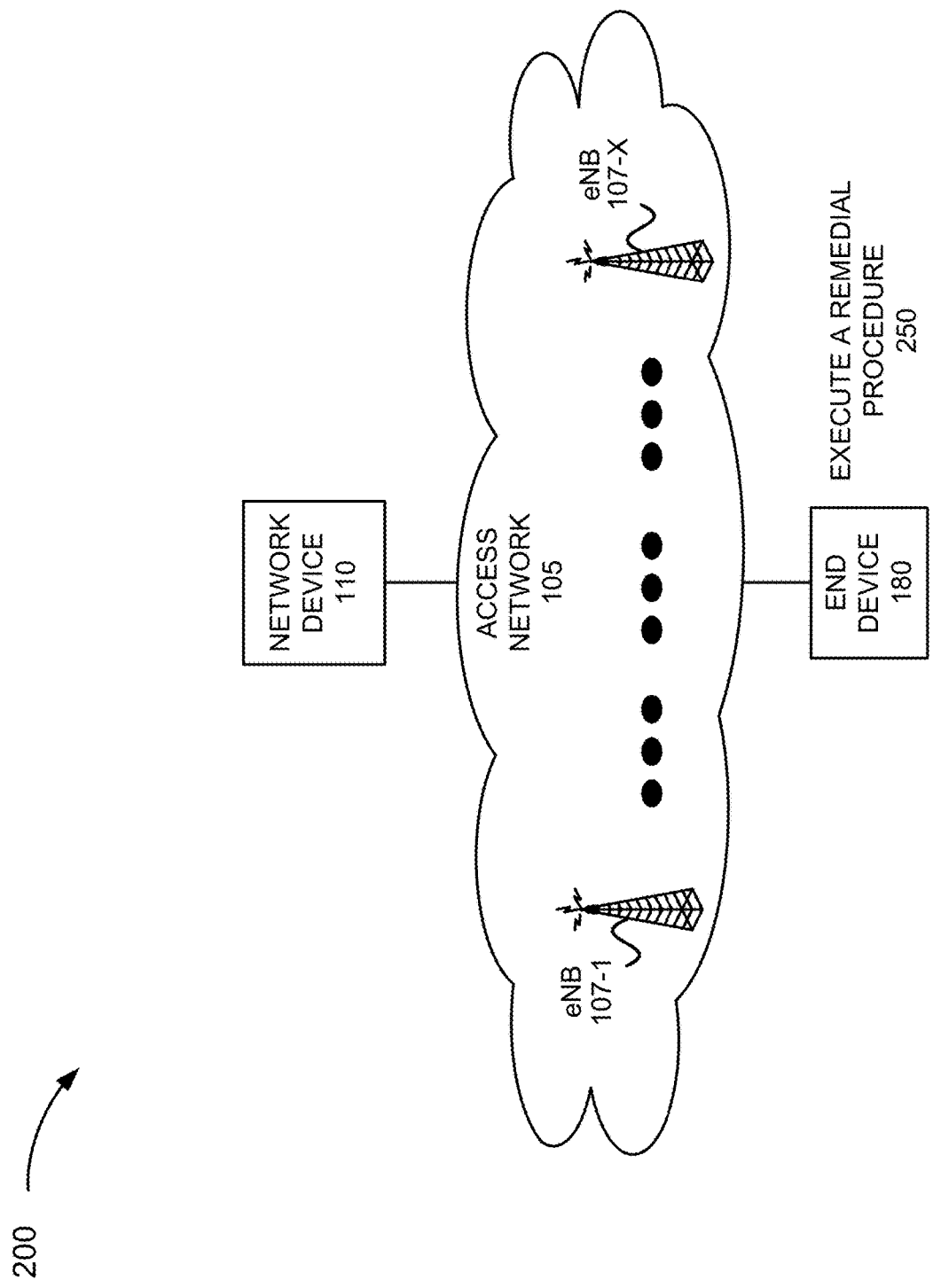

Referring to FIG. 2I, depending on the result of the analysis described, end device 180 may identify the target cell as an island tracking area code cell 240, or identify the target cell as not an island tracking area code cell 245. Referring to 2J, when end device 180 identifies the target cell as an island tracking area code cell, end device 180 may autonomously correct the issue by executing a remedial procedure 250. For example, end device 180 may include logic to assign a different tracking area code to the target cell via a configuration management (CM) system that manages tracking area code assignment.

According to other embodiments, end device 180 may perform other types of remedial measures, such as flagging the target cell as a potential island tracking area code cell, reporting the issue to another device for subsequent review by a person (e.g., an administrator, etc.), and/or perform another type of inspection, further review, and/or correction procedure.

According to various exemplary embodiments, the remedial procedure performed may be dependent on the threshold probability value (TPV). For example, when a high threshold probability value is set and satisfied (e.g., TPV>0.9 or some other value), end device 180 may automatically assign a new tracking area code to the target cell (e.g., the selected candidate tracking area code). Alternatively, for example, when a lower threshold probability value is set and satisfied (e.g., 0.75<TPV<0.9), end device 180 may flag this issue and report it for subsequent human review. According to various exemplary embodiments, the island tracking area code detection and remedial service may include multiple threshold probability values, which in turn, may correlate to different types of remedial measures being performed when the threshold probability value is satisfied.

Although FIGS. 2A-2J illustrate an exemplary process of the island tracking area code detection and remedial service, according to other exemplary embodiments, the process may include additional, different, and/or fewer steps, include additional, different, and/or fewer messages, and/or a different ordering of steps. For example, with reference to FIG. 2D, the step of determining candidate tracking area codes may be performed subsequent to the performance of another step (e.g., calculating a Euclidean distance, calculating a weighted score, etc.) such that the Euclidean distance or weighted score is correlated to a TAC.

FIG. 4 is a diagram illustrating exemplary components of a device 400 that may be included in one or more of the devices described herein. For example, device 400 may correspond to components included in end device 180, access device 107, and network device 110. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with respect to end device 180, software 420 may include an application that, when executed by processor 410, provides a function of the island tracking area code detection and remedial service, as described herein. Additionally, with reference to network device 110, software 420 may include an application that, when executed by processor 410, provides a function of the island tracking area code detection and remedial service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, spun up, spun down, etc., using well-known virtualization techniques in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
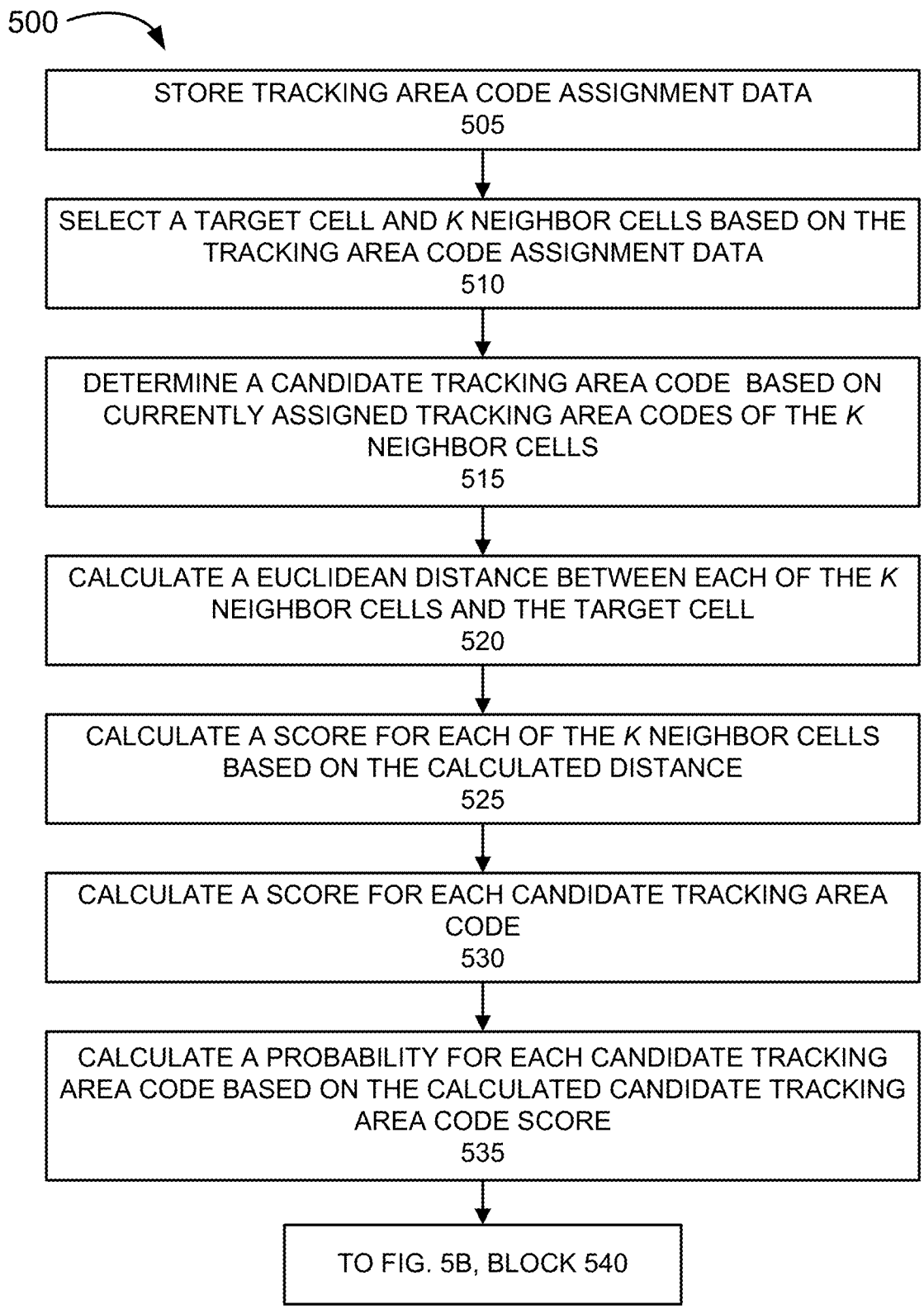
FIGS. 5A and 5B are flow diagrams illustrating an exemplary process of an exemplary embodiment of the island tracking area code detection and remedial service.
Figure 5B:
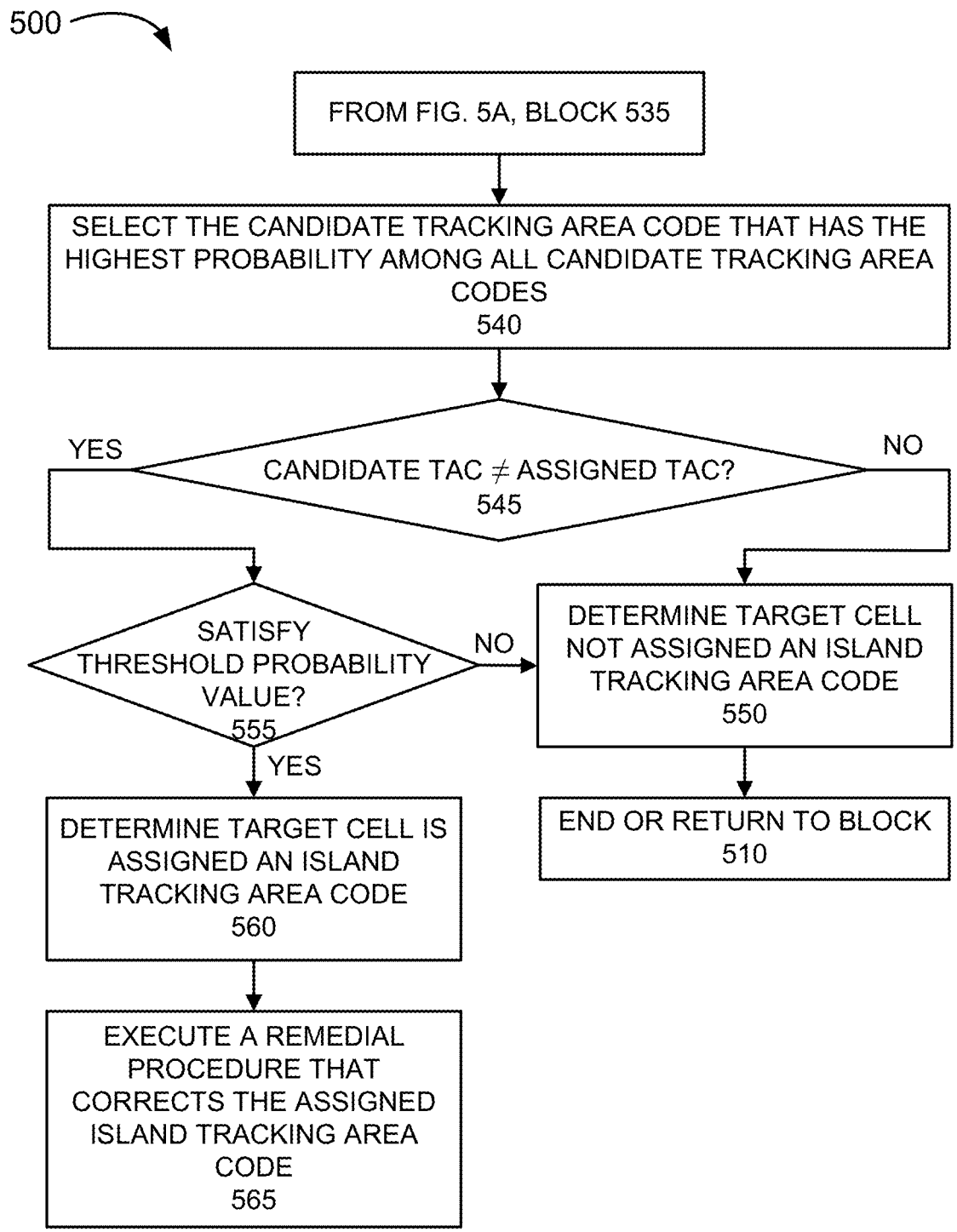

FIGS. 5A and 5B are flow diagrams illustrating an exemplary process 500 of an exemplary embodiment of the island tracking area code detection and remedial service. According to an exemplary embodiment, end device 180 performs steps of process 500. According to other exemplary embodiments, network device 110 performs steps of process 500. According to yet other exemplary embodiments, end device 180 and network device 110 each perform a portion of the steps of process 500. For example, processor 410 executes software 420 to perform a step illustrated in FIGS. 5A and/or 5B, as described herein. Additionally, or alternatively, a step illustrated in FIG. 5A and/or 5B may be performed by execution of only hardware.

Referring to FIG. 5A, in block 505, tracking area code assignment data may be stored. For example, end device 180 or network device 110 may ingest and store the tracking area code assignment data. In block 510, a target cell and k neighbor cells may be selected based on the tracking area code assignment data. For example, end device 180 and/or network device 110 may select a cell to test and select k neighbor cells relative to the target cell under test.

In block 515, a candidate tracking area code may be determined based on the currently assigned tracking area codes of the k neighbor cells. For example, end device 180 and/or network device 110 may identify and select one or multiple candidate tracking area codes that shared among the k neighbor cells.

In block 520, a Euclidean distance between each of the k neighbor cells and the target cell may be calculated. For example, end device 180 and/or network device 110 may calculate a Euclidean distance between each of the k neighbor cells and the target cell, as previously described in relation to equation (1). In block 525, a score for each of the k neighbor cells may be calculated based on the calculated distance. For example, end device 180 and/or network device 110 may calculate a score, which is weighted based on distance to the target cell, for each of the k neighbor cells, as previously described in relation to equation (2).

In block 530, a score for each candidate tracking area code may be calculated. For example, end device 180 and/or network device 110 may calculate a score for each candidate tracking area code based on an aggregation of the scores associated with tracking area codes of the k neighbor cells that match the candidate tracking area code. In block 535, a probability for each candidate tracking area code may be calculated based on the calculated candidate tracking area code score. For example, end device 180 and/or network device 110 may calculate a probability value for each candidate tracking area code based on a normalization of the calculated candidate tracking area code scores.

Referring to FIG. 5B, in block 540, the candidate tracking area code that has the highest probability among all candidate tracking area codes may be selected. For example, end device 180 and/or network device 110 may select the candidate tracking code with the highest probability value.

In block 545, it may be determined whether the candidate tracking area code equals the assigned tracking area code. For example, end device 180 and/or network device 110 may compare the candidate tracking area code to the assigned tracking area code of the target cell.

When it is determined that the candidate tracking area code equals the assigned tracking area code (block 545-NO), then it may be determined that the target cell is not assigned an island tracking area code (block 550). For example, end device 180 and/or network device 110 may determine that the target cell is not assigned an island tracking area code. Process 500 may end, or process 500 may return to block 510.

When it is determined that the candidate tracking area code does not equal the assigned tracking area code (block 545-YES), then it is determined whether the probability value associated with the candidate tracking area code satisfies a threshold probability value (block 555). For example, end device 180 and/or network device 110 may compare the probability value of the candidate tracking area code to the threshold probability value. Based on the result of the comparison, end device 180 and/or network device 110 may determine whether the probability value satisfies the threshold probability value.

When it is determined that the probability value associated with the candidate tracking area code does not satisfy the threshold probability value (block 555-NO), it may be determined that the target cell is not assigned an island tracking area code (block 550). For example, end device 180 and/or network device 110 may determine that an island tracking area code issue does not exist. Alternatively, for example, although not illustrated, end device 180 and/or network device 110 may make another type of determination that requires further investigation, reporting to another device, etc., as previously described, in relation to a remedial measure.

When it is determined that the probability value associated with the candidate tracking area code does satisfy the threshold probability value (block 555-YES), it may be determined that the target cell is assigned an island tracking area code (block 560). In block 565, a remedial procedure may be executed to correct the assigned island tracking area code, as previously described.

Although FIGS. 5A and 5B illustrate an exemplary process 500 of the island tracking area code detection and remedial service, according to other embodiments, process 500 may include additional operations, fewer operations, and/or different operations than those illustrated in FIGS. 5A and 5B, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive. For example, according to other exemplary embodiments, images of tracking area codes assigned to cells of a wireless network may be used to identify island tracking area codes. For example, a computer vision algorithm may be configured to analyze these images. A computer vision model may be trained so as to reliably predict when an island tracking area code condition is present. However, since cells usually overlap on the same access device (e.g., eNB, etc.), the detection of an island tracking area code condition may include distinguishing an island tracking area code condition even when such overlap exists.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIGS. 5A and 5B, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
selecting, by a device, a target cell and neighbor cells of a wireless network;
determining, by the device, one or multiple candidate tracking area codes based on tracking area codes of the neighbor cells;
calculating, by the device, first values of the neighbor cells based on distance values between the neighbor cells and the target cell;
calculating, by the device, one or multiple second values for the one or multiple candidate tracking area codes based on the first values and the one or multiple candidate tracking area codes;
selecting, by the device, one of the one or multiple candidate tracking area codes; and
determining, by the device, whether a tracking area code of the target cell is an island tracking area code based on the one of the one or multiple candidate tracking area codes.

2. The method of claim 1, further comprising:
providing, by the device, a remedial measure when it is determined that the tracking area code of the target cell is the island tracking area code.

3. The method of claim 1, wherein the distance values between the neighbor cells and the target cells are Euclidean distance values.

4. The method of claim 1, wherein the calculating of the first values comprises:
calculating, by the device, a maximum distance value pertaining one of the neighbor cells that is farthest from the target cell;
calculating, by the device, a minimum distance value pertaining to another one of the neighbor cells that is closest to the target cell; and
calculating, by the device, the first values based on the maximum distance value and the minimum distance value.

5. The method of claim 1, wherein the calculating of the one or multiple second values comprises:
selecting, by the device, a first set of neighbor cells whose tracking area code matches the one of the one or multiple candidate tracking area codes; and
aggregating, by the device, each first value of the first set of neighbor cells.

6. The method of claim 1, wherein the determining whether further comprises:
comparing, by the device, the one of the one or multiple candidate tracking area codes to the tracking area code of the target cell; and
determining, by the device, whether the one of the one or multiple candidate tracking area codes matches the tracking area code of the target cell.

7. The method of claim 6, further comprising:
calculating, by the device, one or multiple probability values based on the one or multiple second values;
comparing, by the device, one of the one or multiple probability values of the one of the one or multiple candidate values to a threshold probability value when the one of the one or multiple candidate tracking area codes does not match the tracking area code of the target cell; and
determining, by the device, that the tracking area code of the target cell is the island tracking area code when the one of the one or multiple probability values of the one of the one or multiple candidate value satisfies the threshold probability value.

8. The method of claim 7, further comprising:
replacing, by the device, the tracking area code of the target cell with the one of the one or multiple candidate tracking area codes.

9. A device comprising:
a communication interface;
a memory, wherein the memory stores instructions; and
a processor, wherein the processor executes the instructions to:
select a target cell and neighbor cells of a wireless network;
determine one or multiple candidate tracking area codes based on tracking area codes of the neighbor cells;
calculate first values of the neighbor cells based on distance values between the neighbor cells and the target cell;
calculate one or multiple second values for the one or multiple candidate tracking area codes based on the first values and the one or multiple candidate tracking area codes;
select one of the one or multiple candidate tracking area codes; and
determine whether a tracking area code of the target cell is an island tracking area code based on the one of the one or multiple candidate tracking area codes.

10. The device of claim 9, wherein the processor further executes the instructions to:
provide a remedial measure when it is determined that the tracking area code of the target cell is the island tracking area code.

11. The device of claim 9, wherein the distance values between the neighbor cells and the target cells are Euclidean distance values.

12. The device of claim 9, wherein, when calculating the first values, the processor further executes the instructions to:
calculate a maximum distance value pertaining one of the neighbor cells that is farthest from the target cell;
calculate a minimum distance value pertaining to another one of the neighbor cells that is closest to the target cell; and
calculate the first values based on the maximum distance value and the minimum distance value.

13. The device of claim 9, wherein, when calculating the one or multiple second values, the processor further executes the instructions to:
select a first set of neighbor cells whose tracking area code matches the one of the one or multiple candidate tracking area codes; and
aggregate each first value of the first set of neighbor cells.

14. The device of claim 9, wherein, when determining whether, the processor further executes the instructions to:
compare the one of the one or multiple candidate tracking area codes to the tracking area code of the target cell; and
determine whether the one of the one or multiple candidate tracking area codes matches the tracking area code of the target cell.

15. The device of claim 14, wherein the processor further executes the instructions to:

calculate one or multiple probability values based on the one or multiple second values;

compare one of the one or multiple probability values of the one of the one or multiple candidate values to a threshold probability value when the one of the one or multiple candidate tracking area codes does not match the tracking area code of the target cell; and determine that the tracking area code of the target cell is the island tracking area code when the one of the one or multiple probability values of the one of the one or multiple candidate value satisfies the threshold probability value.

16. The device of claim 15, wherein the processor further executes the instructions to:

replace the tracking area code of the target cell with the one of the one or multiple candidate tracking area codes.

17. A non-transitory computer-readable storage medium storing instructions executable by a processor of a device, which when executed cause the device to:

select a target cell and neighbor cells of a wireless network;

determine one or multiple candidate tracking area codes based on tracking area codes of the neighbor cells;

calculate first values of the neighbor cells based on distance values between the neighbor cells and the target cell;

calculate one or multiple second values for the one or multiple candidate tracking area codes based on the first values and the one or multiple candidate tracking area codes;

select one of the one or multiple candidate tracking area codes; and determine whether a tracking area code of the target cell is an island tracking area code based on the one of the one or multiple candidate tracking area codes.

18. The non-transitory computer-readable storage medium of claim 17, wherein the instructions further comprise instructions, which when executed cause the device to:

provide a remedial measure when it is determined that the tracking area code of the target cell is the island tracking area code.

19. The non-transitory computer-readable storage medium of claim 17, wherein the instructions to determine whether further comprise instructions, which when executed cause the device to:

compare the one of the one or multiple candidate tracking area codes to the tracking area code of the target cell; and determine whether the one of the one or multiple candidate tracking area codes matches the tracking area code of the target cell.

20. The non-transitory computer-readable storage medium of claim 17, wherein the distance values between the neighbor cells and the target cells are Euclidean distance values.

* * * * *